United States Patent
Echigoya et al.

(10) Patent No.: US 7,449,227 B2
(45) Date of Patent: Nov. 11, 2008

(54) VACUUM INSULATION PANEL AND REFRIGERATOR INCORPORATING THE SAME

(75) Inventors: Wataru Echigoya, Iwafune (JP); Kuninari Araki, Itakura (JP); Tsuyoshi Kubota, Ohira (JP); Takashi Miseki, Ohira (JP)

(73) Assignee: Hitachi Appliances, Inc., Tokyo (JP)

( * ) Notice: Subject to any disclaimer, the term of this patent is extended or adjusted under 35 U.S.C. 154(b) by 202 days.

(21) Appl. No.: 11/246,523

(22) Filed: Oct. 11, 2005

(65) Prior Publication Data

US 2006/0088685 A1 Apr. 27, 2006

(30) Foreign Application Priority Data

Oct. 12, 2004 (JP) ............... 2004-297091

(51) Int. Cl.
*B65D 81/38* (2006.01)
(52) U.S. Cl. .................. 428/69; 428/124; 428/128
(58) Field of Classification Search .................. 428/69, 428/124, 128; 62/45.1, 400
See application file for complete search history.

(56) References Cited

U.S. PATENT DOCUMENTS

| 3,162,566 A | 12/1964 | Katz |
| 5,900,299 A * | 5/1999 | Wynne ............... 428/69 |
| 6,132,837 A | 10/2000 | Boes et al. |
| 6,863,949 B2 * | 3/2005 | Ehrmanntraut ............ 428/69 |
| 2003/0134078 A1 * | 7/2003 | Urata et al. .............. 428/69 |

FOREIGN PATENT DOCUMENTS

| EP | 0 682 206 A1 | 11/1995 |
| JP | 58-127085 | 7/1983 |
| JP | 62-158974 | 7/1987 |
| JP | 4-337195 | 11/1992 |
| JP | 04-337195 | 11/1992 |
| JP | 08-082474 | 3/1996 |
| JP | 8-82474 | 3/1996 |
| JP | 09-138058 | 5/1997 |
| JP | 2003-262296 | 9/2003 |
| JP | 2004-003534 | 1/2004 |

\* cited by examiner

*Primary Examiner*—Alexander Thomas
(74) *Attorney, Agent, or Firm*—Antonelli, Terry, Stout & Kraus, LLP.

(57) ABSTRACT

The invention relates to a vacuum insulation panel which can be used as an insulator for a refrigerator requiring heat insulation to be provided and also to a refrigerator incorporating such a vacuum insulation panel. The invention particularly relates to an arrangement for preventing convection spaces from being formed where an edge of the vacuum insulation panel is folded back. The vacuum insulation panel includes a core which has an inner film bag in which a flexible inorganic fiber laminate is accommodated, and an outer barrier bag which is made of gas-impermeable film such as metallic foil laminated film and which accommodates the core. The inner film bag includes a welded portion and a ventilation portion. The outer barrier bag has a depressurized interior and has been sealed by welding. An edge of the inner film bag is placed in an edge of the outer barrier bag.

8 Claims, 10 Drawing Sheets

FIG. 4A
PROCESS ACCORDING TO THE INVENTION

- STEP 32: CUTTING UNPROCESSED CORE MATERIAL
- STEP 33: DRYING UNPROCESSED CORE MATERIAL
- INNER FILM BAG →
- STEP 34: TEMPORARY COMPRESSION AND BAGGING
- OUTER BARRIER BAG →
- STEP 35: BAGGING
- STEP 36: VACUUM SEALING
- STEP 37: EDGE FOLDING
- STEP 38: INSPECTION
- STEP 39: COMPLETION

FIG. 4B
CONVENTIONAL PROCESS

- CUTTING UNPROCESSED CORE MATERIAL
- BINDER IMPREGNATION/DEHYDRATION
- CUTTING IMPREGNATED CORE
- HEAT-SHAPING
- CUTTING CORE MATERIAL
- DRYING CORE MATERIAL
- OUTER BARRIER BAG →
- BAGGING
- VACUUM SEALING
- EDGE FOLDING
- INSPECTION
- COMPLETION

INNER FILM BAG

BREAKING INNER FILM BAG

DEPRESSURIZATION
SEAL-WELDING

EDGE FOLDING

VACUUM INSULATION PANEL AND REFRIGERATOR INCORPORATING THE SAME

CLAIM OF PRIORITY

The present application claims priority from Japanese application serial JP 2004-297091 filed on Oct. 12, 2004, the content of which is hereby incorporated by reference into this application.

FIELD OF THE INVENTION

The present invention relates to a vacuum insulation panel which can be used as an insulator for a refrigerator requiring heat insulation to be provided and also to a refrigerator incorporating such a vacuum insulation panel.

BACKGROUND OF THE INVENTION

In recent years, promotion of energy saving is strongly demanded from a viewpoint of preventing global warming. With regard to electrical home appliances, too, energy saving is an urgent task to be tackled. Particularly, in the field of refrigerators and freezers where efficient use of heat is important, high-performance heat insulators are in high demand.

Insulators made of such fiber as glass wool or such polyfoam as polyurethane foam are in general use. To increase the insulation performance of such insulators, it is necessary to increase their thickness. Therefore, they cannot be used in cases in which space where insulators can be filled is strictly limited or in cases in which highly effective use of space is imperative.

Under the circumstances, vacuum insulation panels have been introduced for use as high-performance heat insulators. A vacuum insulation panel is a heat insulator produced by putting a core, which plays a role of spacer, in a gas-barrier-performing outer barrier bag, depressurizing the interior of the outer barrier bag and sealing the outer barrier bag. Such a vacuum insulation panel, for example, like the one disclosed in Japanese Patent Laid-Open No. H9(1997)-138058 has a core made of such fiber as glass wool cured and shaped using an organic binder.

A core made of such fiber as glass wool cured using a binder, however, may scratch or tear, with burrs formed on it, an outer barrier bag when it is put in the outer barrier bag. Hence, a vacuum insulation panel having a core produced using no binder has been proposed.

Such a vacuum insulation panel to be produced using no binder has an inner film bag in which such fiber as glass wool is accommodated. The inner film bag is compressed, its interior is depressurized, and its opening is seal-welded. An example of such a vacuum insulation panel is disclosed in Japanese Patent Laid-Open No. H4(1992)-337195.

When vacuum insulation panels are used in a refrigerator, in a space filling foam insulation between an outer box and an inner box of the refrigerator, the vacuum insulation panels may be placed toward the outer box, toward the inner box, or in intermediate positions between the outer box and the inner box. In practice, they are placed toward the outer box. To be more concrete, they are, in many cases, attached to an internal surface of the outer box using two-sided adhesive tape or hot-melt adhesive.

There are reasons why the vacuum insulation panels are placed toward the inner box in fewer cases. There is an advantage to placing vacuum insulation panels toward the inner box. That is, the area to which vacuum insulation panels are to be applied is smaller when the vacuum insulation panels are placed toward the inner box than when they are placed toward the outer box. There are however problems associated with placing the vacuum insulation panels toward the inner box. The inner box, for example, is more prone to get deformed than the outer box, and the outer surface of the inner box is more irregular than the inner surface of the outer box. Therefore, it is difficult to firmly fix vacuum insulation panels to the outer surface of the inner box. In addition, when foam insulation is filled between the inner box and the outer box, cavities tend to be formed between the vacuum insulation panels and the inner box. Such cavities if formed may cause the inner box to be deformed and the insulation performance of the refrigerator to decline.

Patent literature 1: Japanese Patent Laid-Open No. H9(1997)-138058.

Patent literature 2: Japanese Patent Laid-Open No. H4(1992)-337195

In a case where a core to be put in a vacuum insulation panel is produced using a binder, an organic or inorganic fiber laminate is cured into a board-like shape using an organic or inorganic binder. The cured fiber laminate is then cut into a prescribed size, for example, using a press. The core produced in this way can have a stable shape. Also, the core having been cured is easy to handle. There are however problems posed by the core produced in the above-described way. For example, when such a core is put in an outer barrier bag or when the interior of an outer barrier bag in which such a core is put is depressurized, burrs formed in end portions of the core when it was cut using a press may scratch or tear the outer barrier bag. Furthermore, with the core being a hard board, when the interior of the outer barrier bag in which the core is put is depressurized, the core, without changing its shape, scratches or tears the outer barrier bag with burrs formed in its end portions. Also at the time of the depressurization, convection spaces looking like erected tents are formed between the outer barrier bag and end faces of the core. If the core gets deformed in the process of production, it results in a deformed, for example, warped vacuum insulation panel. Such a vacuum insulation panel may cause trouble when it is attached to the outer box of a refrigerator.

The convection spaces are formed more easily when the board-like core is thicker or when the outer barrier bag is less flexible.

There is another problem with a core produced using a binder. Suppose, for example, vacuum insulation panels, their cores in particular, are to be removed for recycling from a refrigerator which was in use for 10 years. If a fiber laminate making up the core of a vacuum insulation panel used in the refrigerator is impregnated with a binder, it is powderized when the core is taken out and broken down. At such a time, the fiber laminate is powderized into irregularly sized particles which cannot be conveniently recycled. It is difficult to remove the fiber laminate and the binder separately and re-shape the fiber laminate to produce a new core.

The vacuum insulation panel disclosed in Japanese Patent Laid-Open No. H4(1992)-337195 has a core produced by compressing a fiber laminate making use of an inner film bag without using any binder and depressurizing and shaping the inner film bag in which the fiber laminate is put. The core thus produced is put in an outer barrier bag thereby producing a vacuum insulation panel.

To be more concrete, the vacuum insulation panel disclosed in Japanese Patent Laid-Open No. H4(1992)-337195 is produced as follows: an inner member (core) is produced by putting an inorganic fiber mat in an inner film bag made of plastic film, compressing and depressurizing the interior of the inner film bag and seal-welding the inner film bag opening; the inner member (core) is put in an accommodating member (outer barrier bag); the inner film bag is broken; the interior of the accommodating member is depressurized; and the accommodating member (outer barrier bag) is seal-welded. This method allows use of a glass wool mat as a core material to be put in the vacuum insulation panel, so that the heat insulation panel is described as having remarkably improved heat insulation performance compared with vacuum insulation panels using conventional core material such as foam perlite or inorganic powder.

The core used in the vacuum insulation panel disclosed in Japanese Patent Laid-Open No. H4(1992)-337195 is not like a board. It is therefore free of burrs which are formed when a board-like core material is cut and which may damage the outer barrier bag in which it is put. It does not get warped, and convection spaces looking like erected tents are not easily formed between end faces of the core and the outer barrier bag. In the Japanese Patent Laid-Open No. 4-337195, however, no measure for making convection spaces, which may be formed, smaller is proposed, and no consideration is given to convection spaces which may be formed where an edge of the outer barrier bag is processed.

When an outer barrier bag is made of aluminum foil, it is superior in terms of gas-barrier characteristic. A problem with such an outer barrier bag is that, with the heat conductivity of aluminum itself being high, heat conduction (heat bridging) via the outer barrier bag makes it difficult to achieve adequate heat insulation performance.

The present invention provides a vacuum insulation panel, which is free of convection spaces as described above, which has superior heat insulation performance, which makes, in the production process, edge folding easy, and which can be produced with high productivity, and also a refrigerator incorporating the same.

According to the present invention, a refrigerator incorporating vacuum insulation panels with high recyclability can be provided.

According to the present invention, a vacuum insulation panel free of binder can be provided by using a binderless core which does not cause the vacuum insulation panel to warp and which is advantageous in securing plane flatness accuracy.

SUMMARY OF THE INVENTION

To address the above problems, a vacuum insulation panel according to the present invention has a core including an inner film bag in which a flexible inorganic fiber laminate is accommodated, and an outer barrier bag made of gas-impermeable film such as metallic foil laminated film for accommodating the core. The inner film bag includes a welded portion and a ventilation portion. The outer barrier bag has a depressurized interior and has been sealed by welding. An edge of the inner film bag is placed in an edge of the outer barrier bag.

The edge of the inner film bag is placed in a seal-welded opening of the outer barrier bag causing an edge that includes the seal-welded opening of the outer barrier bag to be thicker than other welded edges.

As described above, edges of the inner film bag containing the inorganic fiber laminate are placed inside edges of the outer barrier bag. Therefore, when an edge of the outer barrier bag is folded back, the radius of bend of the edge is added to by the thickness of the inner film bag. With the edge folded back with a larger radius of bend, even if foreign objects are present in the edge, they are prevented from damaging the outer barrier bag. Furthermore, heat conducted, in the edge portion, from a warmer side of the outer barrier bag via a metallic foil (for example, an aluminum foil layer or an evaporated metallic layer) is partly blocked by the edge of the inner film bag, so that the heat conduction is reduced.

The edge of the inner film bag is located in the opening to be welded of the outer barrier bag. Therefore, when the opening is welded, the thickness of the welded portion is larger than that of other welded portions. When the opening is welded, the inner film bag placed in the opening portion being welded serves as welding material to facilitate welding of the outer barrier bag. With the thickened welding material provided, even if foreign objects are present in the portion being welded, they can be accommodated within the thick welding material, so that the portion can be securely seal-welded.

To address the above problems, a vacuum insulation panel according to the present invention includes a core which accommodates a flexible inorganic fiber laminate and an outer barrier bag which includes a metallic layer, has a gas-barrier characteristic and accommodates the core. The interior of the outer barrier bag has been depressurized and sealed. An edge of the outer barrier bag is each folded back along an end surface of the core.

A vacuum insulation panel according to the present invention has a core including an inner film bag in which a flexible inorganic fiber laminate is accommodated and an outer barrier bag which includes a metallic layer, has a gas-barrier characteristic and accommodates the core including the inner film bag. The interior of the outer barrier bag has been depressurized and sealed. An edge of the outer barrier bag is folded back, together with an edge of the inner film bag, along an end surface of the core in a manner not to allow a convection space to be formed between the outer barrier bag and the core.

Corners formed by edge lines at ends of the core of the vacuum insulation panel are round having been pressed by the outer barrier bag when the interior of the outer barrier bag was depressurized.

Corners formed by edge lines at ends of the inorganic fiber laminate included in the vacuum insulation panel have been rounded by compressing the inorganic fiber laminate in the inner film bag, depressurizing the interior of the outer barrier bag, and seal-welding the edges of the outer barrier bag. The inner film bag is placed where the corners formed by edge lines have been rounded.

The inorganic fiber laminate is made of glass wool, glass fiber, alumina fiber, or silica-alumina fiber.

The inner film bag is made of polyethylene film with a thickness of 15 to 50 μm or, preferably with a thickness of 20 to 30 μm.

The outer barrier bag is made of laminated film having a heat-welding plastic layer and a metallic layer.

A refrigerator according to the present invention includes vacuum insulation panels and foam insulation set in heat insulation spaces formed between an outer box and an inner box, the vacuum insulation panels being one of those described above.

Using a flexible core as described above can prevent, without fail, formation of convection spaces which look like erected tents and which used to be formed, when a conventional core is used, between end faces of the core and an outer barrier bag. This makes it possible to produce a vacuum insulation panel with high insulation effect. Since corners of the core are rounded and the core is flexible, the core abutting against the outer barrier bag does not damage the outer barrier bag, so that the reliability of the outer barrier bag is not decreased by the core. If the core is warped, it can be corrected easily with the core itself being flexible.

When, for example, the inner film bag is made of 20-μm thick film, even if foreign objects with a dimension of up to 40 μm, that is two times the film thickness, get in the inorganic fiber, they do not reach the outer barrier bag, so that they cannot damage the outer barrier bag.

When a core is produced according to the present invention, the interior of an inner film bag in which core material is put is compressed to evacuate air from the inner film bag. The core produced through such a process can be stored as it is. Being able to be easily put in temporary storage, the core contributes toward productivity improvement.

Since the inorganic fiber laminate is made of such material as glass wool, glass fiber, alumina fiber, or silica-alumina fiber, it can be recycled to contribute toward environmental preservation.

The inner film bag is made of polyethylene film with a thickness of 15 to 50 μm. The minimum thickness of 15 μm is determined taking into account that the inner film bag is required to have a gas-barrier characteristic. The inner film bag put in an outer barrier bag as part of a vacuum insulation panel is higher in heat conductivity than the core material, so that it can become a heat conducting layer. With this taken into consideration, the maximum film thickness is determined to be 50 μm.

When, for example, the inner film bag film is 20 μm thick, the inner film bag thickness is 40 μm, that is, two times the film thickness. The inner film bag thickness and the outer barrier bag thickness combined can tolerate foreign objects with a dimension of up to 40 μm getting in the inorganic fiber laminate without allowing them to damage the outer barrier bag. This facilitates productivity improvement. Furthermore, inside where an edge of the outer barrier bag is folded back, an edge of the inner film bag is placed, so that the edge of the outer barrier bag is prevented from being bent nearly at a right angle. That is, the radius of bend of the edge is added to by the thickness of the inner film bag. Thus, the outer barrier bag is prevented from being damaged.

In the production process, the core material put in the inner film bag is compressed, air is evacuated from the interior of the inner film bag, and the inner film bag is seal-welded. To make the seal-welding of the inner film bag a stable process, the film making up the inner film bag is preferred to have a thickness of 20 to 30 μm.

A refrigerator which includes vacuum insulation panels and foam insulation set in heat insulation spaces formed between an outer box and an inner box can prevent heat transfer via convection spaces which occur in conventional refrigerators. Since edges of the vacuum insulation panels can be folded with increased reliability, the reliability of the refrigerator can be further improved.

According to the present invention, a vacuum insulation panel which is superior in heat insulation, whose edges can be folded with ease, which can be produced with high productivity and which can be efficiently recycled, and also a refrigerator incorporating such a vacuum insulation panel can be provided.

A vacuum insulation panel according to the present invention has a core produced using no binder, so that it is advantageous in terms of correcting warping and securing flatness accuracy.

BRIEF DESCRIPTION OF THE DRAWINGS

FIGS. 4A and 4B show diagrams for comparing and explaining production processes for the vacuum insulation panel according to the present embodiment and for conventional vacuum insulation panels.

DESCRIPTION OF THE PREFERRED EMBODIMENT

An embodiment of the present invention will be described in the following with reference to FIGS. 1 to 12B.

Figure 1:
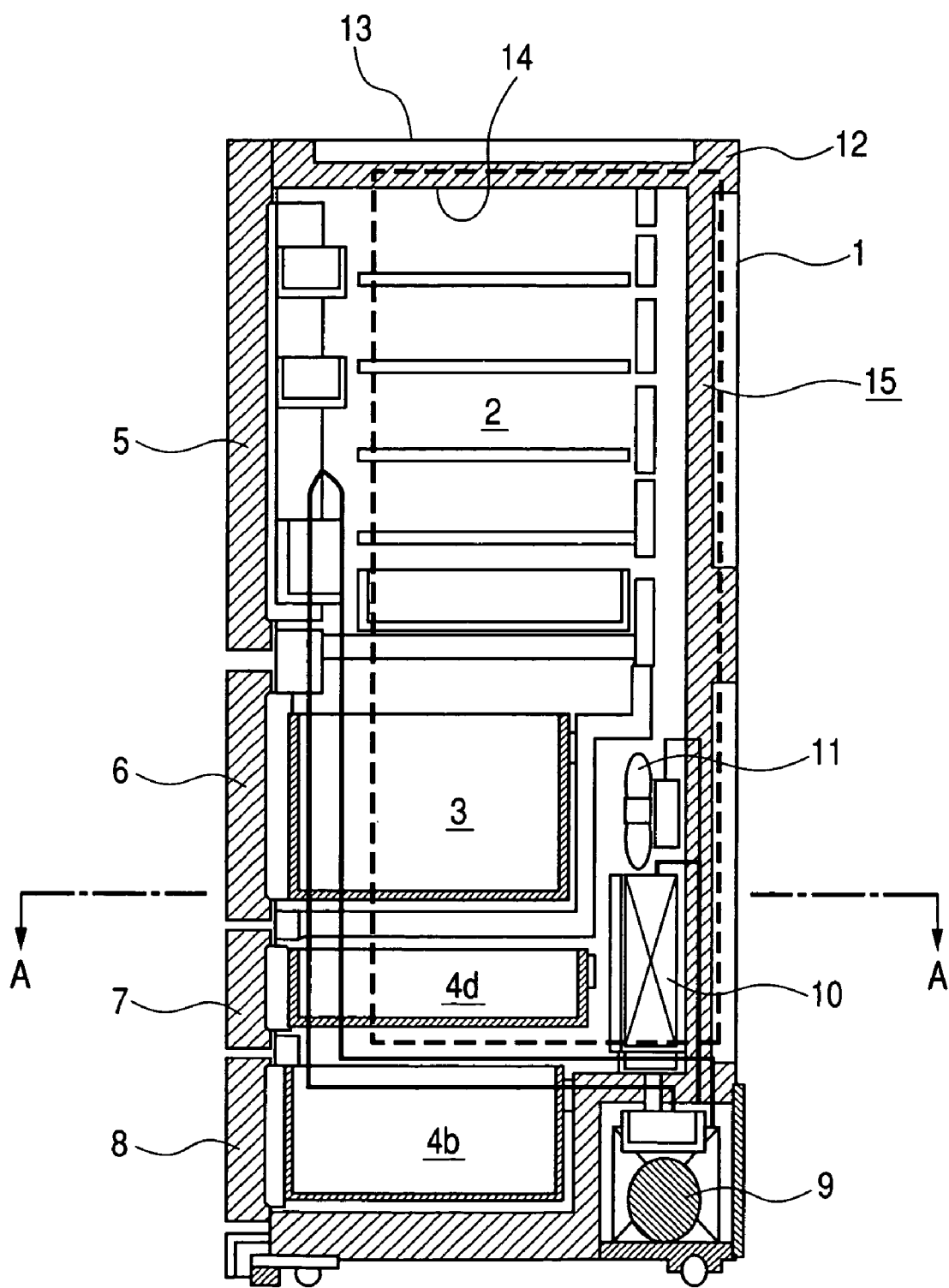
FIG. 1 is a vertical sectional view of a refrigerator according to an embodiment of the present invention.
Figure 2:
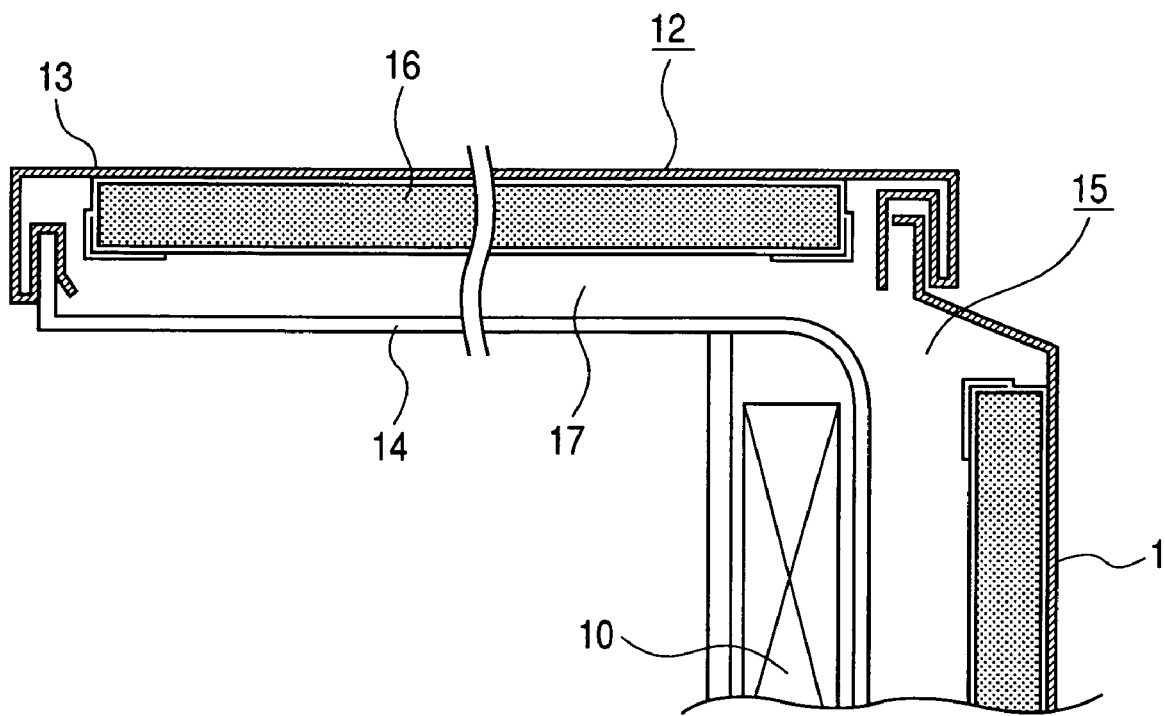
FIG. 2 is an enlarged view of a principal part taken along line A-A of FIG. 1.
Figure 3A:
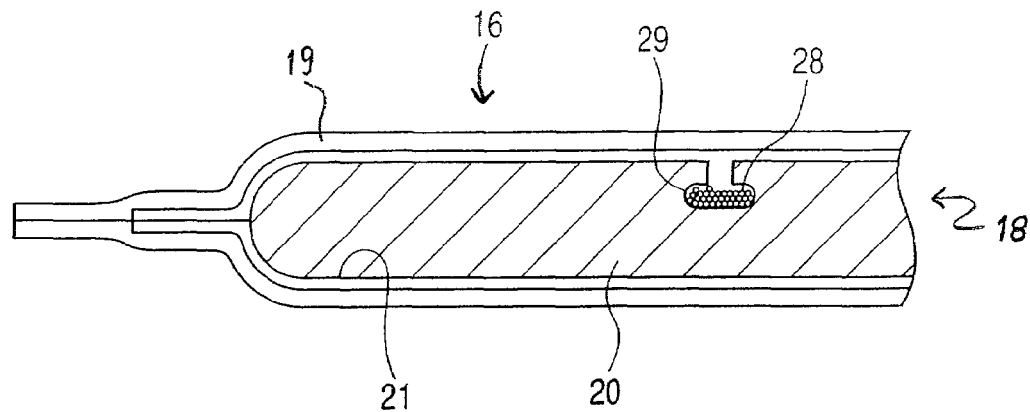
FIGS. 3A to 3C show diagrams for comparing and explaining a vacuum insulation panel according to the present embodiment and conventional vacuum insulation panels.
Figure 3B:
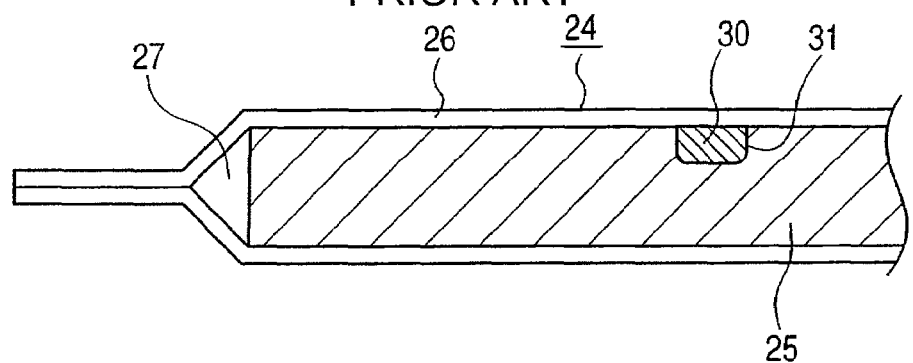
Figure 3C:
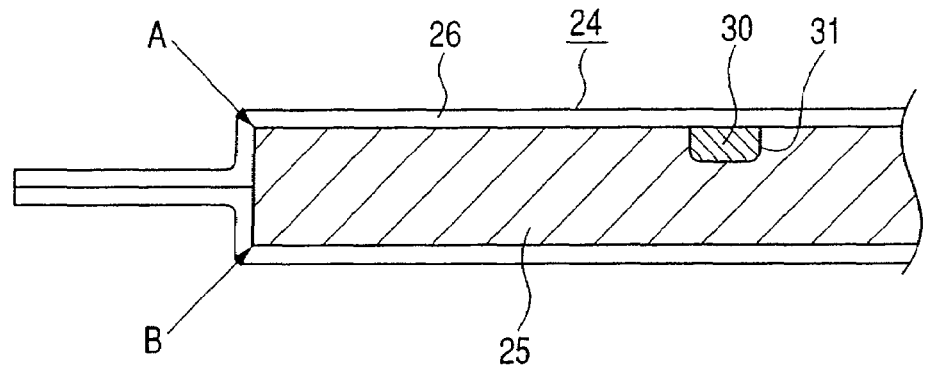
Figure 5A:
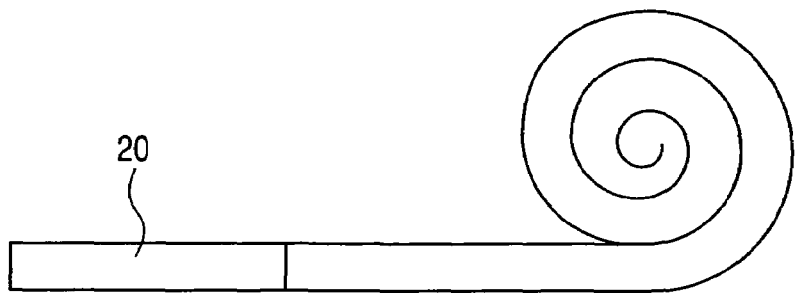
FIGS. 5A to 5C show diagrams for explaining a core production process.
Figure 5B:
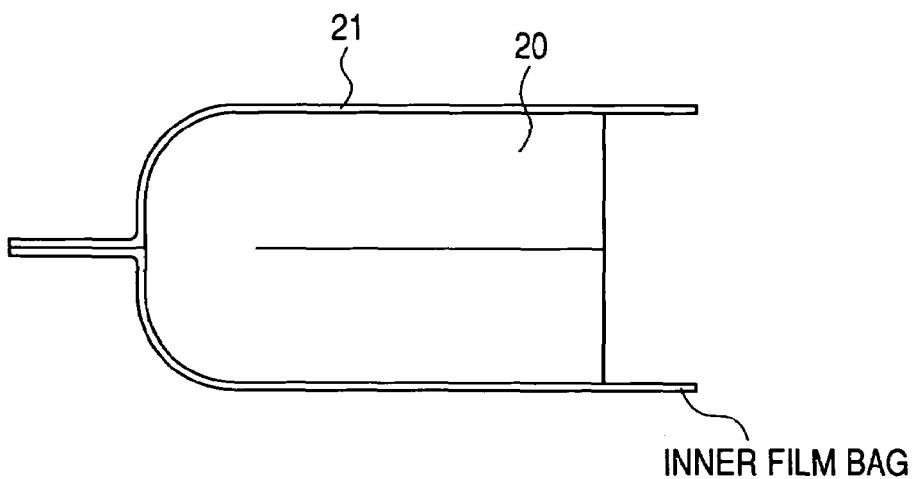
Figure 5C:
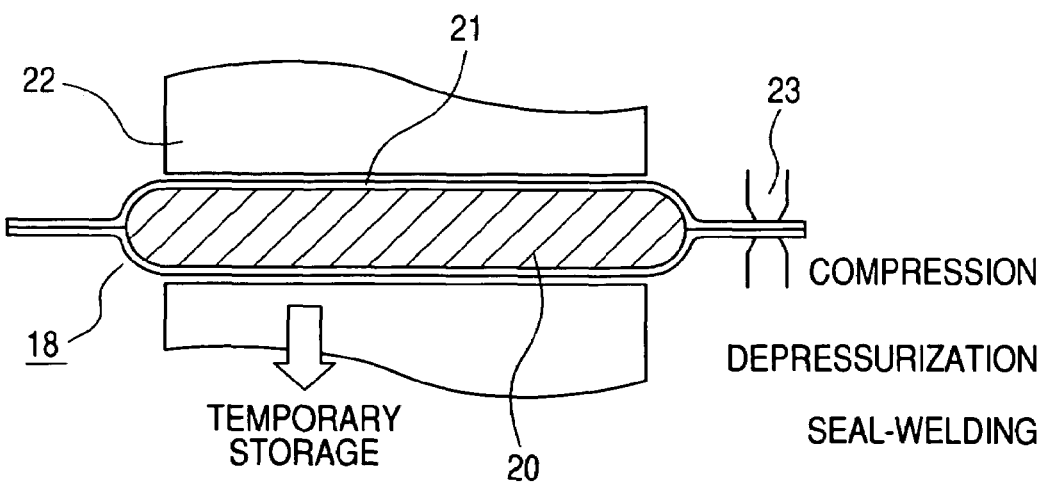
Figure 6A:
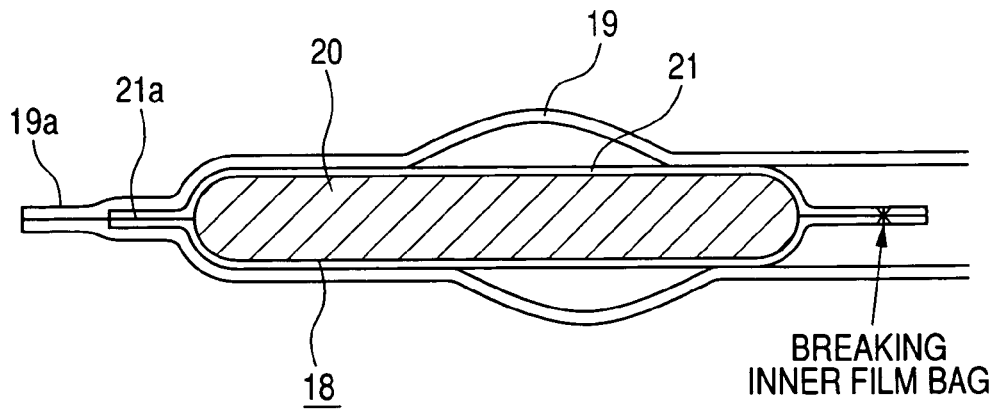
FIGS. 6A to 6C show diagrams for explaining a vacuum insulation panel production process.
Figure 6B:
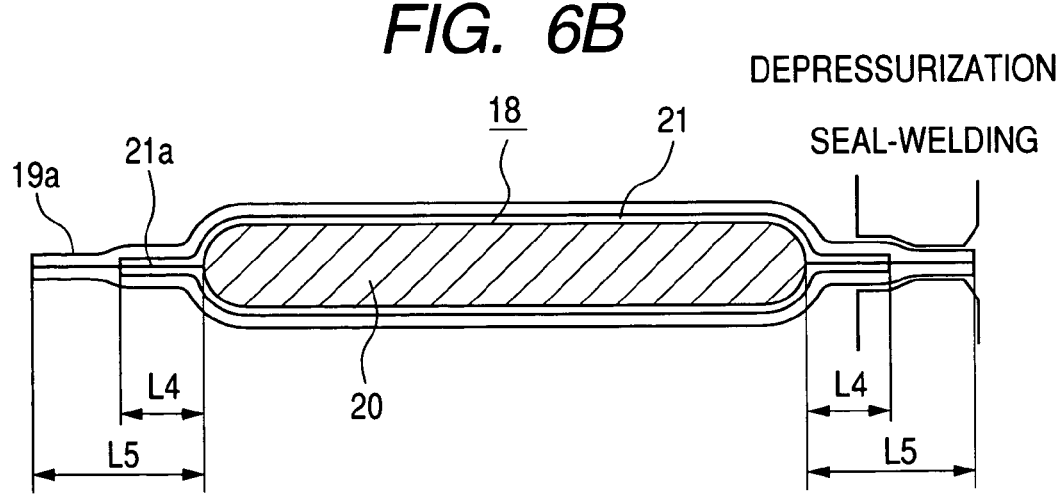
Figure 6C:
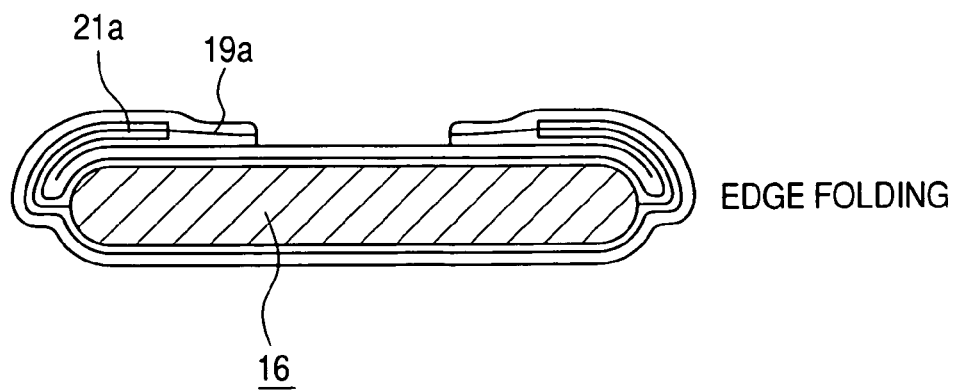
Figure 7:
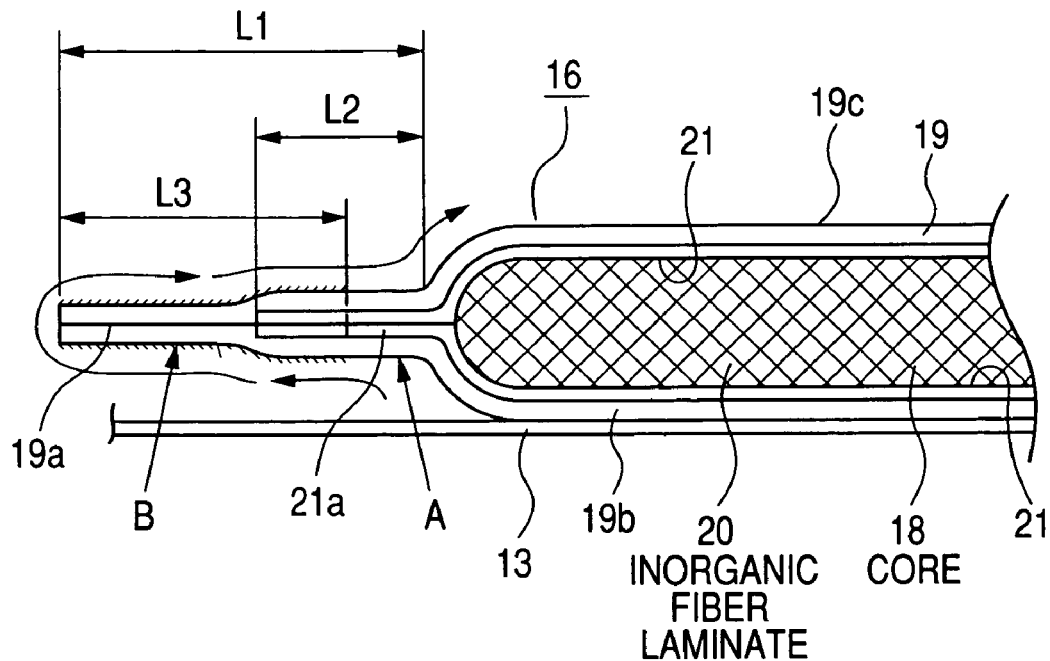
FIG. 7 is a diagram for explaining an edge of the vacuum insulation panel according to the present embodiment.
Figure 8:
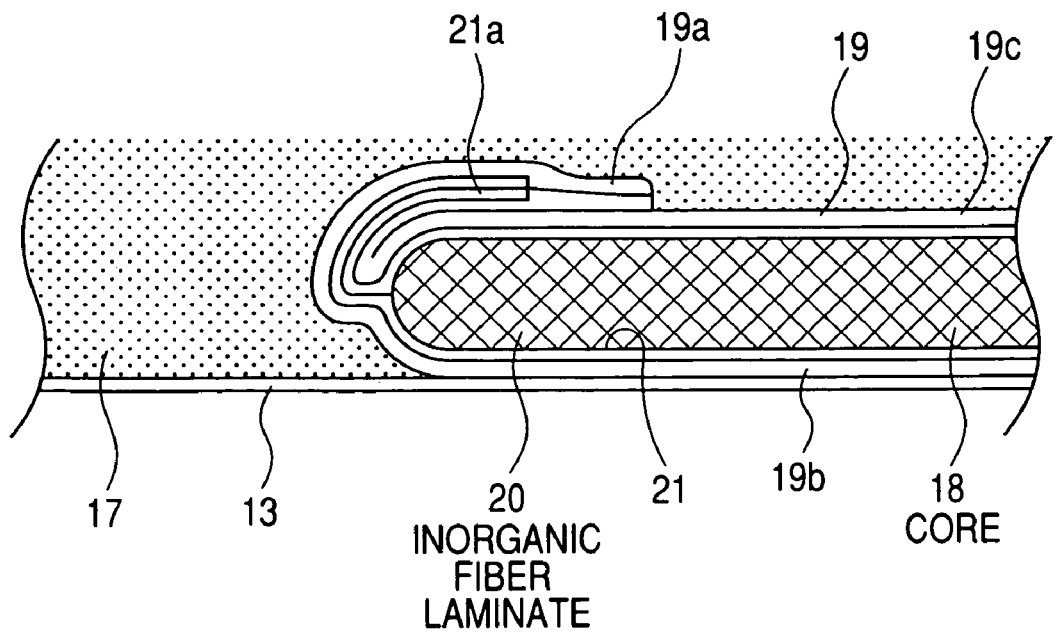
FIG. 8 is a diagram showing the vacuum insulation panel according to the present embodiment set in an outer box.
Figure 9:
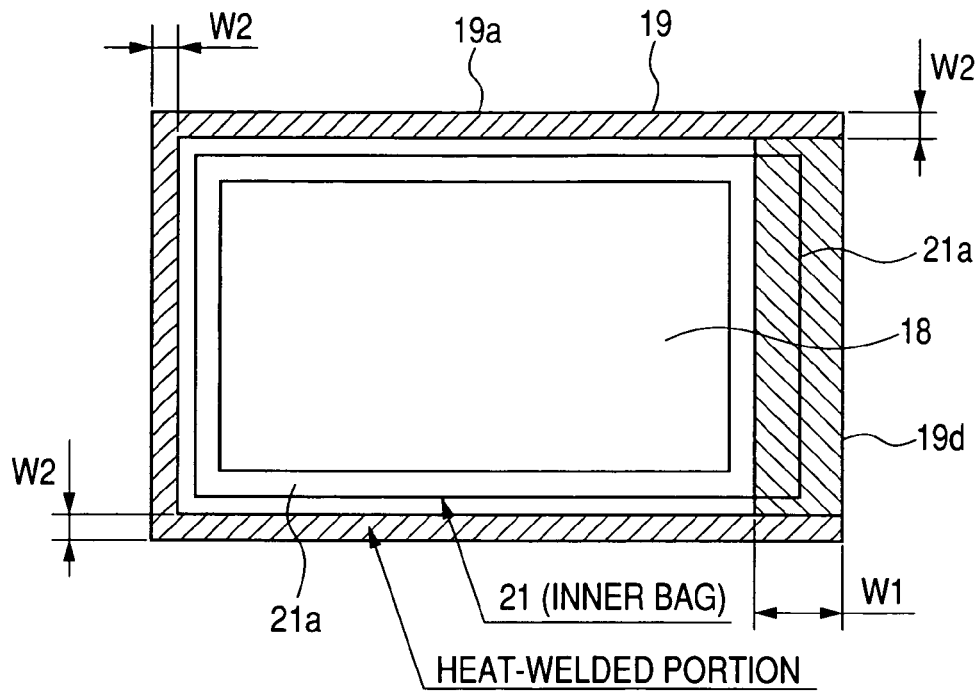
FIG. 9 is a diagram for explaining an arrangement of an outer barrier bag and an inner film bag.
Figure 10:
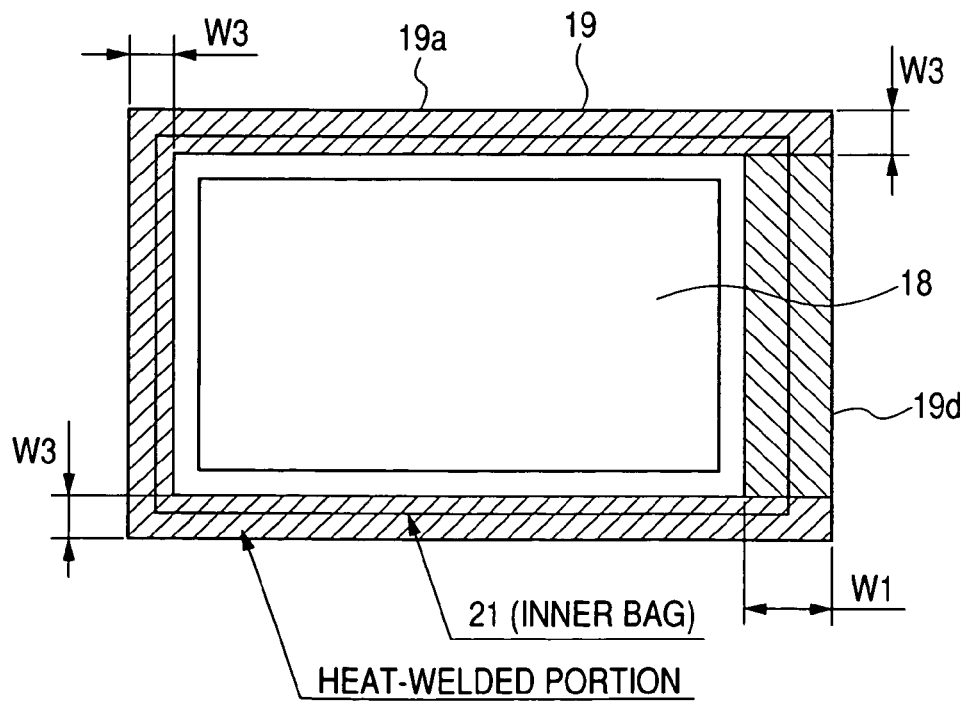
FIG. 10 is a diagram for explaining another arrangement of an outer barrier bag and an inner film bag.
Figure 11A:
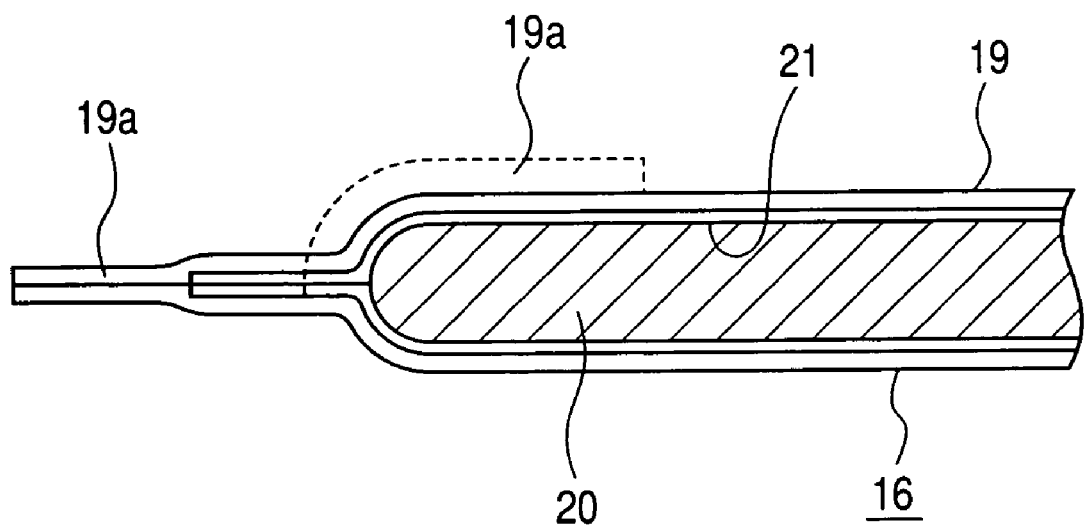
FIGS. 11A and 11B show diagrams for comparing and explaining ways in which an edge is bent.
Figure 11B:
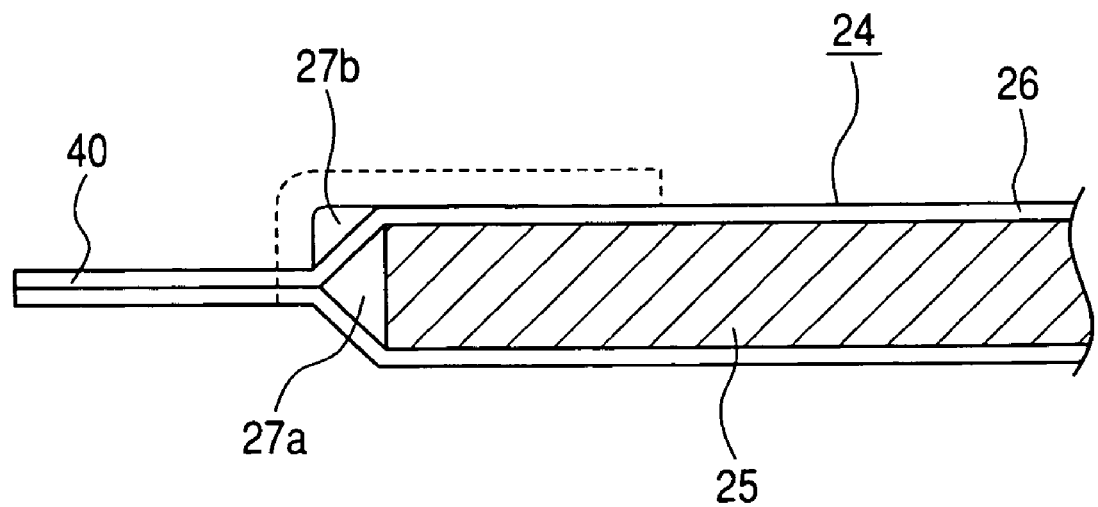
Figure 12A:
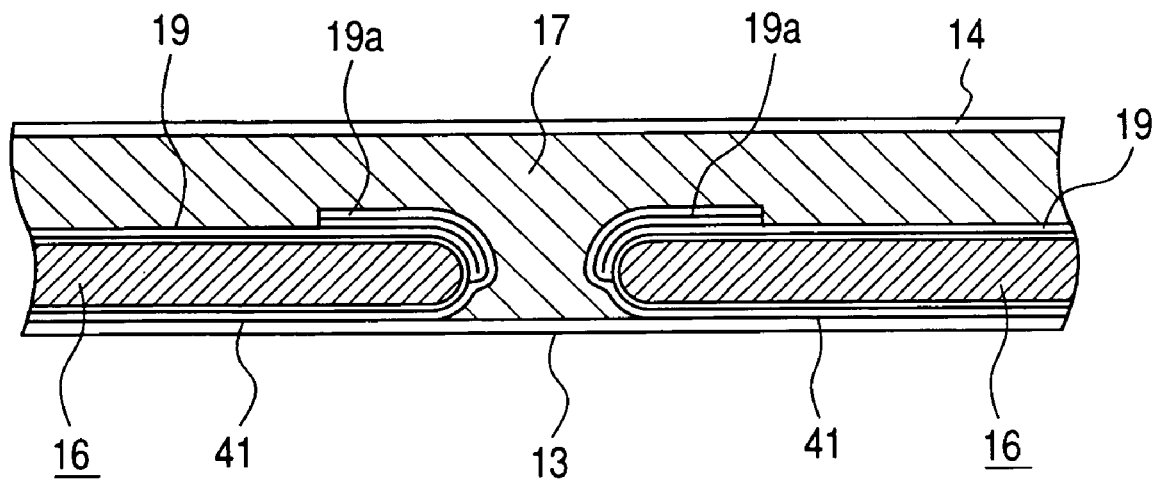
FIGS. 12A and 12B show diagrams for comparing and explaining vacuum insulation panels set in a refrigerator.
Figure 12B:
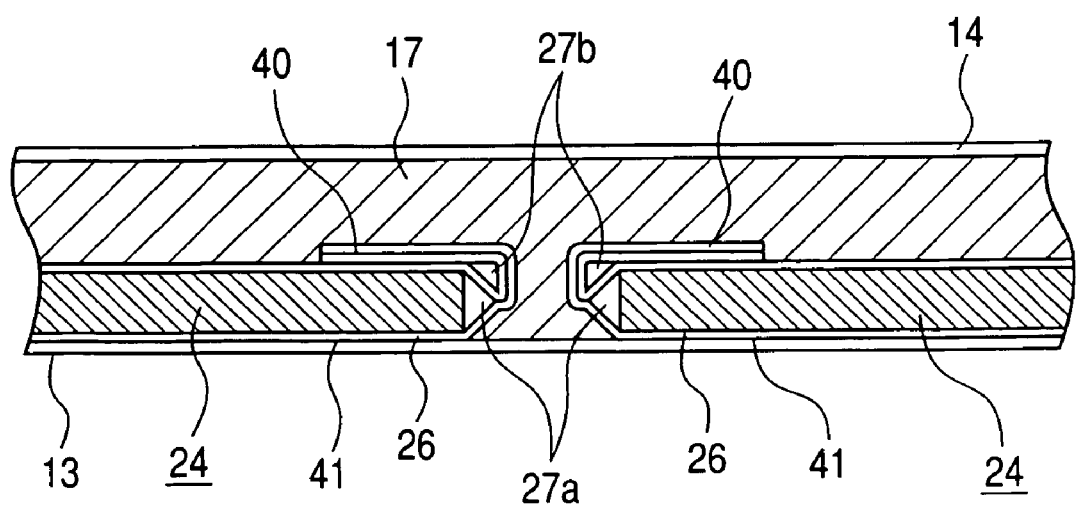

FIG. 1 is a vertical sectional view of a refrigerator to which the present invention is applied. FIG. 2 is an enlarged view of a principal part taken along line A-A of FIG. 1. FIGS. 3A TO 3C show diagrams for explaining a vacuum insulation panel according to the present embodiment. FIG. 3A shows the vacuum insulation panel according to the present embodiment. Parts (b) and (c) show conventional vacuum insulation panels in general use. FIGS. 4A and 4B show diagrams for explaining a vacuum insulation panel production process according to the present embodiment. FIG. 4A describes a vacuum insulation panel production process according to the present embodiment. FIG. 4B describes a general vacuum insulation production process. FIGS. 5A to 5C show diagrams for explaining a process for producing a core for the vacuum insulation panel according to the present embodiment. FIGS. 6A to 6C show diagrams for explaining a process in which the vacuum insulation panel according to the present embodiment is completed using the core shown in FIGS. 5A to 5C. FIG. 7 is a diagram for explaining an edge of the vacuum insulation panel according to the present embodiment. FIG. 8 shows the vacuum insulation panel set in an inner box. FIGS. 9 and 10 are diagrams for explaining arrangements of an outer barrier bag and an inner film bag. FIGS. 11A and 11B show diagrams for explaining how the edge as shown in FIG. 7 is bent. FIG. 11A shows an edge of the vacuum insulation panel according to the present embodiment. FIG. 11B shows an edge of a general vacuum insulation panel. FIGS. 12A and 12B show the vacuum insulation panels shown in FIGS. 11A and 11B set, respectively, in an insulation space formed between an outer box and an inner box of, for example, a refrigerator. FIG. 12A shows the vacuum insulation panel according to the present embodiment set in the insulation space. FIG. 12B shows a general vacuum insulation panel set in the insulation space.

Referring to FIGS. 1 and 2, a refrigerator body 1 includes a chill compartment 2, a vegetable compartment 3, a first freezer compartment 4a, and a second freezer compartment 4b being arranged from the top down in the mentioned order.

The refrigerator body 1 is also provided with doors 5 to 8 which respectively close the front openings of the corresponding compartments, that is, the chill compartment 2, the vegetable compartment 3, the first freezer compartment 4a, and the second freezer compartment 4b. The doors 6 to 8 are pull-out doors. Pulling them out pulls out the containers making up the corresponding compartments, respectively. The refrigerator body 1 also has a refrigeration cycle system which includes a compressor 9 provided at a bottom back of the refrigerator body and an evaporator 10 provided in the back of the freezer compartments. A circulation fan 11 is provided above the evaporator 10. It sends cold air to each compartment to keep the refrigerator interior at a prescribed temperature. It makes up a part of the refrigeration cycle system that includes the compressor 9, the evaporator 10, a condenser (not shown), and a capillary tube (not shown).

A frame 12 forms an outline of the refrigerator body 1. The frame 12 includes an outer box 13, an inner box 14, and an insulation wall 15.

The insulation wall 15 includes a vacuum insulation panel 16 according to the present embodiment and a foam insulation 17.

The foam insulation 17 is a foam-in-place insulation such as adhesive urethane foam. The vacuum insulation panel 16 is made to be higher in thermal insulation performance than the foam insulation 17.

When, for example, the foam insulation 17 has a heat conductivity of 0.016 W/mK or so, the vacuum insulation panel 16 is made to have a heat conductivity of 0.002 W/mK or so.

Therefore, on the assumption that the heat leaking area of an insulation wall is kept unchanged, the insulation wall made only of a foam insulation like urethane can be replaced by a vacuum insulation panel whose thickness is about ⅕ to ⅙ that of the insulation wall made of the foam insulation, without affecting the amount of heat leakage from the insulation wall. However, when the insulation wall included in the frame 12 is made only of vacuum insulation panels, the outer box 13 and the inner box 14 cannot be bonded together, so that the frame cannot meet a design value of strength. According to the present embodiment, therefore, the foam insulation 17 made of, for example, adhesive urethane is used to bond the outer box 13 and the inner box 14 together. The foam insulation 17 ranges in thickness from about 5 mm to 20 mm. Namely, its average thickness is about 15 mm with its thinnest portions having a thickness of at least 5 mm so as to secure a space to be filled with the foam insulation 17 needed to maintain a required strength of the frame 12.

In the insulation wall 15, the vacuum insulation panels 16 are placed, to achieve high insulation efficiency, such that they primarily cover parts of the refrigerator where the amount of heat leakage is larger than at other parts. In the insulation space of the refrigerator, the ratio of space occupied by the vacuum insulation panels 16 is held at 60% or less. To be more concrete, when, with a refrigerator in an erected state, the height of the refrigerator frame including doors is larger than the width and the depth of the frame, the vacuum insulation panels 16 are placed inside the walls on the vertical sides and on the back, and inside the doors. Based on this arrangement, the total volume of the vacuum insulation panels is held at or below 60% of the total volume of the insulation space formed by the outer box 13 and the inner box 14.

When the total volume of the vacuum insulation panels exceeds 60% of the total volume of the insulation space formed by the outer box 13 and the inner box 14, the foam insulation 17 such as urethane foam cannot be uniformly filled in. When the foam insulation 17 is not uniformly filled in, voids are formed in the foam insulation, as a result, decreasing the strength of the foam insulation and lowering its insulation efficiency. Furthermore, piping (not shown) of the evaporator 10 and wiring (not shown) of the circulation fan 11 may abut against and scratch the vacuum insulation panels 16.

Next, the vacuum insulation panel 16 will be described with reference to FIGS. 3A to 6C.

First, referring to FIGS. 3A to 3C, the vacuum insulation panel 16 includes a core 18 and an outer barrier bag 19 which is made of, for example, metallic foil laminated film and which has a heat-welding plastic layer. The core 18 includes an inorganic fiber laminate 20 and an inner film bag 21. The inner film bag 21 is made of, for example, polyethylene film with a thickness of 20 μm.

Generally, the laminate 20 is made of glass wool, glass fiber, alumina fiber, silica-alumina fiber, or natural fiber such as cotton. The inner film bag 21 is made of synthetic resin film such as polyethylene with a thickness of 20 μm. The film thickness of 20 μm is used because the thickness allows the film to be supple enough to be adsorbed, when the interior of the inner film bag is depressurized, to the inorganic fiber laminate without causing convection spaces to be formed between itself and the inorganic fiber laminate and also because the thickness enables the film to receive and hold foreign objects which get in where the opening of an outer barrier bag, being described later, is seal-welded, thereby preventing the foreign objects from sticking out of the outer barrier bag.

The core 18 is, as shown in FIGS. 5A to 5C being explained later, produced as follows: a prescribed size and shape of the inorganic fiber laminate 20 is cut from a roll of the inorganic fiber laminate 20 with a thickness of 100 to 150 mm; the inorganic fiber laminate thus cut is, after being folded into two or three, put in the inner film bag 21 (made of polyethylene film with a thickness of about 20 μm) as shown in FIG. 5B; the inorganic fiber laminate is compressed using a press 22; the interior of the inner film bag 21 is depressurized; and the opening of the inner film bag 21 is hermetically heat-welded using a heat welder 23.

The binderless core thus produced through the process of compression, depressurization, and seal-welding is put in use as a part of the vacuum insulation panel 16.

Even though the core 18 contains no binder, it is formed to match the shape of the vacuum insulation panel 16, so that it can adequately function as a spacer, that is, the principal function of a core. In addition, the core, having a certain degree of flexibility, easily fits where it is to be placed.

To go into more details, the inorganic fiber laminate 20, that has a thickness of, for example, 200 to 300 nm in an unprocessed state prior to a compression process or a depressurization process, is flattened by 20 to 25 times, that is, to a thickness of 8 to 15 mm through compression and depressurization. When the inorganic fiber laminate 20 is compressed, it expands outwardly to fill gaps between itself and the inner film bag 21.

In the depressurization process, the inner film bag with a film thickness of about 20 μm is made to press the inorganic fiber laminate 20 from its outside periphery. In other words, the thickness of the inner film bag 21 is appropriate in order to prevent spaces looking like erected tents from being formed. Namely, the inner film bag 21 with that thickness is appropriately flexible (easily transformable to fit the shape of what is put in it).

Next, a conventional vacuum insulation panel in general use will be described with reference to FIGS. 3B and 3C. A conventional vacuum insulation panel 24 includes a core 25.

The core 25 is a board, formed using a binder, with a thickness of 8 to 15 mm with edges cut, for example, by a press.

Putting the core 25 in an outer barrier bag 26 (metallic foil laminated film), depressurizing the interior of the outer barrier bag 26, and seal-welding the outer barrier bag produces the vacuum insulation panel 24 as shown in FIGS. 3B and 3C. The vacuum insulation panel 24 shown in FIG. 3B includes a convection space 27 formed in an end portion of the core 26 on account of poor flexibility of the outer barrier bag 26. The vacuum insulation panel 24 shown in FIG. 3C includes no convention space. This is because good flexibility of the outer barrier bag 26 caused the outer barrier bag to come in tight contact with the end portion of the core when the interior of the outer barrier bag was depressurized. The outer barrier bag 26 is made of plastic-metallic foil laminated film. Its plastic portion is welded to seal the opening of the outer barrier bag 26.

If the vacuum insulation panel 24 shown in FIG. 3B is used as an insulation wall of a refrigerator, moisture or gas getting out of the fiber in the core will collect in the convection space 27 over an extended period of time. The collected moisture or gas will then convect in the convection space 27 to transfer heat. As a result, insulation performance of the vacuum insulation panel 24 will remarkably deteriorate.

The vacuum insulation panel 24 shown in FIG. 3C, on the other hand, includes no convection space. However, with corners A and B of the core 25 abutting against the inside surface of the outer barrier bag 26, the outer barrier bag 26 may possibly be damaged by burrs formed on the corners.

In other words, there used to be a great possibility of the outer barrier bag being damaged, at the corners A and B, by burrs formed when the core 25 was cut, for example, by a press.

In FIG. 3A, reference numeral 28 denotes an adsorbent. The adsorbent 28 may be, for example, molecular sieve 13× which is a synthetic zeolite. The adsorbent 28 adsorbs moisture and gas getting out of the core material. Even though the core 18 (inorganic fiber laminate 20) is to be dried out before being put in the outer barrier bag 19, completely removing gas and moisture from it is not practicable costwise. Completely desiccating it takes a great amount of time and is therefore impracticable. This is why the adsorbent 28 is used. The performance of the adsorbent 28 is limited, though. When the vacuum insulation panel including the adsorbent 28 is incorporated as a heat insulator in a refrigerator, it cannot be assured that the adsorbent 28 will be effective for a period of, for example, 10 years. When the adsorbent 28 loses its effect, gas and moisture collected in convection spaces starts convection to transfer heat as described above.

The adsorbent 28 is filled in an adsorbent holding section 29. The inner film bag 21 also serves to prevent the adsorbent 28 from getting out of the adsorbent holding section 29. Therefore, the adsorbent 28 is to be put in the adsorbent holding section 29 before the process of compression, depressurization, and seal-welding is performed.

In FIGS. 3B and 3C, reference numeral 30 denotes an adsorbent. The function of the adsorbent is the same as that of the adsorbent shown in FIG. 3A. In the examples shown in FIGS. 3B and 3C, the adsorbent 30 is placed in an adsorbent holding section 31 provided in a core 25 which has been cured using a binder. Since, in these cases, nothing like the inner film bag 21 according to the present embodiment is used, it is possible for the adsorbent 30 to get out of the adsorbent holding section 31 and damage the outer barrier bag 26 by entering between the core 25 and the outer barrier bag 26. Hence, in these cases, it is necessary to use a means, for example, a lid, for closing the adsorbent holding section 31.

Next, differences between production processes for the vacuum insulation panel 16 and for the conventional vacuum insulation panel 24 will be described with reference to FIGS. 4A and 4B. FIG. 4A describes a vacuum insulation panel production process according to the present embodiment. FIG. 4B describes a conventional vacuum insulation production process.

First, a process for producing the vacuum insulation panel 18 according to the present embodiment will be described with reference to FIG. 4A. In step 32, a prescribed size and shape of unprocessed core material is cut from a roll of the unprocessed core material. In step 33, the unprocessed core material thus cut is dried in a drying oven (at 230 C°) and the dried core material is then put in an inner film bag. In step 34, the core material is temporarily compressed and then bagged (process of compression—depressurization—seal-welding) to be made a core. The core thus produced can be put in temporary storage.

Next, in step 35, the core is put in an outer barrier bag and then the inner film bag is broken. In step 36, the interior of the outer barrier bag is depressurized, its opening is seal-welded thereby vacuum-sealing the core.

Subsequently, in step 37, the edges (being described later) around the vacuum insulation panel 16 are folded back and fixed on one side (for example, on the top side).

In step 38, the vacuum insulation panel 16 produced as described above is subjected to final inspection performed using, for example, a heat conductivity meter. When it passes the inspection, the process for producing the vacuum insulation panel 16 ends.

Next, referring to FIG. 4B, the production process for the conventional vacuum insulation panel 24 differs from the production process shown in FIG. 4A particularly in that a binder is used in the production process shown in FIG. 4B. Namely, the production process shown in FIG. 4B includes such steps as (binder impregnation and dehydration)—(cutting of impregnated core)—(heat shaping)—(core material cutting).

These steps included in the production process shown in FIG. 4B are required when a binder is used. In the production process according to the present embodiment, an inner film bag is used making it unnecessary to use any binder.

The production process shown in FIG. 4A will be described with reference to FIGS. 5A to 6C.

FIGS. 5A to 5C are for explaining a process in which a prescribed size and shape of unprocessed core material is cut as indicated by a broken line in FIG. 5A, the core material thus cut is put in an inner film bag, and the core material put in the inner film bag is made into a core by seal-welding the opening of the inner film bag. FIGS. 6A to 6C are for explaining a process in which the core 18 is put in the outer barrier bag 19 to produce the vacuum insulation panel 16.

FIG. 5A shows a process in which a prescribed size and shape of core material is obtained by, after a roll of unprocessed core material is dried, cutting the dried core material at where indicated by the broken line. FIG. 5B shows a state in which the core material (inorganic fiber laminate 20) cut from the rolled core material is put in the inner film bag 21 formed by welding three sides of a film sheet folded into two. In the process in which the above state is generated, the core material 20 that does not include any curing agent such as a binder is transformed, by virtue of its flexibility, along the inner contour of the outer barrier bag 21 thereby causing its corners to be rounded as shown in FIG. 5B.

The core material 20 brought into the state as shown in FIG. 5B is compressed, as shown in FIG. 5C, using the press 22 to have its thickness reduced, for example, by 25 times to become 8 to 15 mm thick. Prior to this compression process, an adsorbent (not shown) is required to be placed in the inner film bag 21.

Subsequently, the interior of the inner film bag 21 is depressurized and the opening of the inner film bag 21 is seal-welded using a welder 23. In this process, the core material 20 is caused to completely fill the inner film bag 21 and to be formed roundly without corners. The core material 20 and the inner film bag 21 thus prepared make up the core 18 for the vacuum insulation panel 16. The core 18 produced in this way can be stored as it is, so that it does not require to be used, as soon as it is produced, in a complete production process. Therefore, when production of the vacuum insulation panel 18 requires to be adjusted, the core 18 can be conveniently put in storage with its interior in a depressurized state.

Referring to FIGS. 6A to 6C, the inner film bag 21 included in the core 18 that is put in the outer barrier bag 19 is broken, for example, at the portion indicated, in FIG. 6A, by "Inner film bag is broken" in preparation for a next process for depressurization. With the inner film bag broken, depressurization, as shown in FIG. 6B, of the interior of the core 18 that includes the inner film bag 21 can be performed smoothly. With regard to what is shown in FIG. 6B, it is particularly worth noting that an edge 21a (portion L4) of the inner film bag 21 is placed inside an edge 19a (portion L5) of the outer barrier bag 19 causing the edge 19a of the outer barrier bag 19 to have a four-layer construction. The inner surface of the outer barrier bag 19 is comprised of a heat-welding layer (plastic layer) of synthetic resin such as low-density polyethylene film, linear low-density polyethylene film or high-density polyethylene film. Since the layer made of such material is compatible with the polyethylene film making up the inner film bag 21, it is possible to heat-weld the four-layer edge of the outer barrier bag 19. When heat-welded, the four-layer edge of the outer barrier bag 19 becomes a unified part. Therefore, even if foreign objects such as dust and dirt get in the opening of the envelop 19 when the core 18 is put in the outer barrier bag, the inner film bag portion to be heat-welded in the opening of the outer barrier bag 19 can receive and hold, as previously described, such foreign objects to allow the outer barrier bag 19 to be securely seal-welded.

The vacuum insulation panel 16 thus produced finally has the edge 19a including the edge 21a folded back, from the base of the edge, on the top side of the outer barrier bag 19 as shown in FIG. 6C. The edge 19a thus folded back is fixed there, for example, using a tape (not shown).

With the end portions of the core 18 being round, the edges 19a and 21a of the vacuum insulation panel 16 according to the present embodiment can be folded back, unlike in the case of conventional vacuum insulation panels, along the round end portions of the core 18 without causing any convection space to be formed between the edge 19a and the outer barrier bag 19 at each of the end portions. In other words, according to the present embodiment, the end portions of the inner film bag 21 are prevented from being bent at a right angle. It is therefore possible to bend the end portions of the inner film bag 21 without worrying about breakage at the corner B shown in FIG. 3C.

It has been conventionally necessary to consider, in addition to the heat transfer by conduction by a metallic portion (barrier layer) of the outer barrier bag 19 included in the vacuum insulation panel 16, heat transfer via convection spaces. The above arrangement minimizes formation of such convection spaces.

In the above arrangement, when the edges are bent, the inner film bag thickness adds to the radius of bend. Therefore, even when foreign objects get in the edge portions, they are prevented from damaging the outer barrier bag. In the edge portions of the outer barrier bag, heat conduction from a warmer side taking place through the metallic layer of the outer barrier bag is partly blocked by the inner film bag and, as a result, the amount of heat conduction is reduced.

Next, with reference to FIGS. 7 and 8, a mechanism of heat conduction (heat bridge) from the outer box 13 to the inner box 14 via the outer barrier bag 19 will be described.

Even though the insulation performance of the vacuum insulation panel 16 is said to be several times that of the foam insulation 17, the insulation efficiency of the outer barrier bag 19, particularly its aluminum foil portion, is low. Heat conduction by the aluminum foil portion is generally referred to as a heat bridge.

The aluminum foil on the surface of the outer barrier bag is, as shown in FIGS. 7 and 8, in contact with the outer box 13.

The heat of the outer box 13 is, therefore, conducted, as shown by arrows in FIG. 7, from a side 19b in contact with the outer box 13 to a side 19c located toward the inner box 14 via the edge 19a. According to the present embodiment, in an edge portion L1, an edge portion L2 is split, as shown in FIG. 7, by the edge 21a of the inner film bag 21. In a portion A, therefore, heat conduction from the side 19b in contact with the outer box 13 to the side 19c located toward the inner box 14 is blocked.

In the above arrangement, the amount of heat conduction from the side 19b in contact with the outer box 13 to the side 19c located toward the inner box 14 can be reduced more by making the edge portion L2 of the edge 21a of the inner film bag 21 longer relative to the edge portion L1 of the outer barrier bag 19. From a production point of view, however, it is advisable to keep the value of L2 divided by L1 0.8 or less.

The outer barrier bag 19 is usually formed by heat-welding two sheets which are to make up the sides 19b and 19c. The portion L1 which leads to the core 18, which includes a heat-welded portion L3 and in which the two sheets are overlapped is referred to as an edge of the outer barrier bag 19. Similarly, the portion L2 which includes a heat-welded portion of the inner film bag and in which two sheets making up the inner film bag 21 are overlapped is referred to as the edge 21a of the inner film bag 21.

The edge 21a of the inner film bag 21 extends inside the portion L3 where the sides 19b and 19c of the outer barrier bag are to be heat-welded. The edge 21a with a thickness of 60 μm of the inner film bag 21 can serve as welding material to secure welding between the two sides 19b and 19c of the outer barrier bag.

FIG. 8 shows a state in which the edges 19a and 21a are folded back and fixed on the side 19c located towaed the inner box 13. As is clear from FIG. 8, the folded edge 19a includes the thickness (60 μm) of the inner film bag 21, so that the radius of bend of the edge is larger than in conventional cases. As a result, the possibility of the outer barrier bag 19 being damaged when it is bent can be greatly reduced and therefore it becomes easier to fold back the edge 19a along the exterior of the core 18.

Next, relations between the outer barrier bag 19 and the inner film bag 21 will be described with reference to FIGS. 9 and 10.

FIG. 9 shows the outer barrier bag 19 and the inner film bag 21 in a state which has been reached by putting the inner film bag 21 in the outer barrier bag 19 formed by heat-welding two sheets of film on three sides with one side left open and then sealing the opening 19d of the outer barrier bag 19 by heat-welding the edge 19a of the outer barrier bag 19 together with the edge 21a of the inner film bag 21.

The width W1 of the sealed opening portion is larger than the width W2 of the heat-welded edges on the other three sides. The edge 21a of the inner film bag 21 extends into the heat-welded edge 19a of the outer barrier bag 19 overlapping with a 60 to 70% portion of the width W1.

In this arrangement, the thermal conduction by the portion whose width is W1 is much smaller than that by the other three portions whose width is W2.

FIG. 10 shows the outer barrier bag 19 and the inner film bag 21 in a state in which the width W3 of the heat-welded portions on three sides of the outer barrier bag 19 is larger than the width W2 shown in FIG. 9. The width W3 has been obtained by, after the inner film bag 21 is put in the outer barrier bag 19, heat-welding the edges (including the heat-welded portion with the width W2 shown in FIG. 9) on the three sides of the outer barrier bag 19 together with the edge 21a of the inner film bag 21. This method in which the edges on the three sides of the outer barrier bag 19 are heat-welded twice involves more processing steps than the method described with reference to FIG. 9. In this way, however, when the edges on the three sides of the outer barrier bag 19 are heat-welded for the second time, the edge 21a of the inner film bag 21 serves as welding material, so that the reliability of heat welding greatly increases.

The opening 19d, through which the inner film bag 21 is put in, of the outer barrier bag 19 is heat-welded in the same way as described with reference to FIG. 9, so that its description is omitted here.

Next, the convection spaces will be described with reference to FIGS. 11A to 12B.

The vacuum insulation panel 16 according to the present embodiment and the conventional vacuum insulation panel 24 are compared in FIGS. 11A to 12B. In FIGS. 11A and 11B, the vacuum insulation panels themselves are compared. In FIGS. 12A and 12B, the vacuum insulation panels are compared in a state in which they are installed as insulators for a refrigerator.

Referring to FIG. 11A, the vacuum insulation panel 16 according to the present embodiment has no convection spaces formed between the inner film bag 21 and the inorganic fiber laminate 20 even at end portions of the inorganic fiber laminate 20. The edge 19a of the outer barrier bag 19 can be folded back, as shown by a broken line, along the outer barrier bag exterior bringing the edge 19a in complete contact with the outer barrier bag exterior, so that no convection spaces are formed between them. In the case of the conventional vacuum insulation panel 24, however, the core 25 becomes like a board by being cured using a binder and it has a flat end face as shown in FIG. 11B.

In this case, even when the interior of the outer barrier bag 26 is depressurized, a convection space 27a tends to be formed at an end portion of the core 25. While the degree of vacuum of the convection space 27a is high, its heat conductivity may be ignorable. When, through an extended period of use of the vacuum insulation panel, the convection space 27a is filled with moisture or gas getting out of the core, however, the heat conduction via the convection space 27a exceeds a permissible value. If the edge 40 of the vacuum insulation panel 24 is folded back as shown, the outer barrier bag 26 coming in contact with the corner B of the core 25 may be damaged, for example, by burrs generated when the core 25 was cut. To avoid such damage to the outer barrier bag 26, the edge 40 is folded back as shown in broken line without applying much tension to the outer barrier bag. In this case (since the edge 40 cannot be folded back along the exterior of the core 18 as shown in FIG. 11A), a convection space 27b is formed where the edge 40 is bent.

The convection space 27b not being a depressurized space conducts heat. Thus, the vacuum insulation panel 24 as a whole cannot be said to be efficient in heat insulation.

FIGS. 12A and 12B show the vacuum insulation panel according to the present embodiment and the conventional vacuum insulation panel, both shown in FIGS. 11A and 11B, in a state in which they are installed in a heat insulator for a refrigerator.

In each of the arrangements shown in FIGS. 12A and 12B, the vacuum insulation panels are attached to the outer box 13 using a hot-melt adhesive or a two-sided adhesive tape 41 and the foam insulation 17 is filled in the heat insulator.

In the arrangements, the edges 19a or 40 are folded back on the side toward the inner box 14 of the outer barrier bag 19.

In the vacuum insulation panel 16 according to the present embodiment, the convection spaces 27a and 27b are not formed. Therefore, no heat transfer attributable to convection spaces takes place and the heat transfer via the metallic portion of the outer barrier bag is the only heat transfer to be taken into consideration. In the conventional vacuum insulation panel 24, however, it is necessary to take measures against not only the heat transfer via the metallic portion of the outer barrier bag 26 but also the heat transfer via the convection spaces 27a and 27b so as to prevent heat from being transferred from the outer box 13 to the inner box 14. A conventional measure taken to prevent such heat transfer has been to increase the thickness of the foam insulation 17.

As described above, the vacuum insulation panel according to the present embodiment of the invention is produced through the following steps: an inorganic fiber laminate is put in an inner film bag; the inner film bag is temporarily compressed, depressurized and seal-welded causing the inorganic fiber laminate, having its own flexibility, in the inner film bag to completely fill the inner film bag without allowing any space to be formed therein; the core thus prepared is put in an outer barrier bag made of material such as metallic foil laminated film; the sealed inner film bag put in the outer barrier bag is broken; the interior of the outer barrier bag is depressurized; and the outer barrier bag is seal-welded. In the vacuum insulation panel thus produced, edges of the inner film bag containing the inorganic fiber laminate are placed inside edges of the outer barrier bag. Therefore, when an edge of the outer barrier bag is folded back, the radius of bend of the edge is added to by the thickness of the inner film bag. With the edge folded back with a larger radius of bend, even if foreign objects are present in the edge, they are prevented from damaging the outer barrier bag. Furthermore, heat conducted, in the edge portion, from a warmer side of the outer barrier bag via a metallic foil such as an aluminum foil included in the outer barrier bag is partly blocked by the edge of the inner film bag, so that the heat conduction is reduced.

An edge of the inner film bag is placed in the opening to be welded of the outer barrier bag. Therefore, when the opening is welded, the thickness of the welded portion is larger than that of other welded portions. Also, when the opening is welded, the inner film bag placed in the opening portion being welded serves as welding material to facilitate welding of the outer barrier bag. With the thickened welding material provided, even if foreign objects are present in the portion being welded, they can be accommodated in the thick welding material, so that the portion can be securely seal-welded.

The inorganic fiber laminate is made of glass wool, glass fiber, alumina fiber, or silica-alumina fiber. The inorganic fiber laminate made of such fiber can be recycled and can contribute toward environmental conservation. With the reliability of seal-welding of the outer barrier bag opening improved and the airtightness of the outer barrier bag greatly enhanced, the inorganic fiber laminate is prevented from getting deteriorated on account of gases infiltrating from outside. This promotes recycling of the inorganic fiber.

The inner film bag is made of heat-weldable synthetic resin with a thickness of 20 to 50 μm. When the resin thickness is 20 μm, foreign objects with a dimension of up to 40 μm getting in the inorganic fiber laminate can be tolerated. When the resin thickness is 50 μm, foreign objects with a dimension of up to 100 μm getting in the inorganic fiber laminate can be tolerated. This contributes toward productivity improvement. In addition, it also prevents convection spaces looking like erected tents from being formed between the inorganic fiber laminate and the inner film bag when the outer barrier bag interior is depressurized.

Furthermore, in a refrigerator according to the present embodiment, the vacuum insulation panels of the present invention are installed in insulation spaces formed between an outer box and an inner box. In the refrigerator incorporating such vacuum insulation panels, heat transfer via convection spaces as seen in conventional refrigerators is suppressed. This makes the refrigerator efficient in heat insulation.

What is claimed is:

1. A vacuum insulation panel comprising:
   a core including an inner film bag made of polyethylene film in which a flexible inorganic fiber laminate that does not include a binder is accommodated in a compressed state, and
   an outer barrier bag which includes a heat-welding polyethylene film layer on its inner surface and a metallic layer on its outer surface, has a gas-barrier characteristic and accommodates the core including the inner film bag, wherein;
   an interior of the outer barrier bag has been depressurized and sealed to provide a unified edge comprising a portion in which edge portions of the outer barrier bag and edge portions of the inner film bag are heat-welded together, and
   the edge portions of the outer barrier bag are folded back, together with the edge portions of the inner film bag, at least at the unified edge along an end surface of the core in a manner not to allow a convection space to be formed between the outer barrier bag and the core,
   wherein corners formed by edge lines at ends of the core are round having been pressed by the outer barrier bag when the interior of the outer barrier bag was depressurized.

2. A vacuum insulation panel comprising:
   a core including an inner film bag made of polyethylene film in which a flexible inorganic fiber laminate that does not include a binder is accommodated in a compressed state, and
   an outer barrier bag which includes a heat-welding polyethylene film layer on its inner surface and a metallic layer on its outer surface, has a gas-barrier characteristic and accommodates the core including the inner film bag, wherein;
   an interior of the outer barrier bag has been depressurized and sealed to provide a unified edge comprising a portion in which edge portions of the outer barrier bag and edge portions of the inner film bag are heat-welded together, and
   the edge portions of the outer barrier bag are folded back, together with the edge portions of the inner film bag, at least at the unified edge along an end surface of the core in a manner not to allow a convection space to be formed between the outer barrier bag and the core,
   wherein corners formed by edge lines at ends of the inorganic fiber laminate have been rounded by compressing the inorganic fiber laminate in the inner film bag, depressurizing the interior of the outer barrier bag, and seal-welding the edge portions of the outer barrier bag, and
   wherein the inner film bag is placed where the corners have been rounded.

3. The vacuum insulation panel according to any one of claims 1-2, wherein an edge of the outer barrier bag comprises a first seal-welded opening section and a second seal-welded opening section, the first seal-welded opening section being heat welded through the heat-welding polyethylene film layer formed on an inner surface of the metallic layer at an outer peripheral side of the edge of the outer barrier bag, the second seal-welded opening section being heat welded through the heat-welding polyethylene film layer formed on an inner surface of the metallic layer and the edge portions of the inner film bag at an inner peripheral side of the edge of the outer barrier bag, and the second seal-welded opening section being thicker than the first seal-welded opening section.

4. The vacuum insulation panel according to any of claims 1-2, wherein the inorganic fiber laminate is made of one of glass wool, glass fiber, alumina fiber, and silica-alumina fiber.

5. The vacuum insulation panel according to any of claims 1-2, wherein the polyethylene film of which the inner film bag is made has a thickness of 15 to 50 μm.

6. The vacuum insulation panel according to any of claims 1-2, wherein the polyethylene film of which the inner film bag is made has a thickness of b 20 to 30 μm.

7. A refrigerator, comprising vacuum insulation panels and foam insulation set in heat insulation spaces formed between an outer box and an inner box, the vacuum insulation panels being as described in one of claims 1-2.

8. The vacuum insulation panel according to any one of 1-2, wherein all edges of the outer barrier bag are folded back, together with the unified edge, along an end surface of the core in a manner not to allow a convection space to be formed between the outer barrier bag and the core.

* * * * *